United States Patent [19]
Carlberg et al.

[11] Patent Number: 5,849,141
[45] Date of Patent: Dec. 15, 1998

[54] METHOD AND APPARATUS FOR PRECISION CARD LAMINATION

[75] Inventors: David L. Carlberg; Ford W. Garratt; Theodore V. Meigs, all of Twain Harte, Calif.

[73] Assignee: Kinematic Automation, Inc., Twain Harte, Calif.

[21] Appl. No.: 549,932

[22] Filed: Oct. 30, 1995

[51] Int. Cl.$^6$ .................................................. B32B 31/00
[52] U.S. Cl. .......................... 156/556; 156/580; 156/285; 269/37
[58] Field of Search .............................. 156/583.8, 583.9, 156/285, 299, 556, 539, 580; 100/233; 269/140, 141, 150, 37, 40

[56] References Cited

U.S. PATENT DOCUMENTS

| | | | |
|---|---|---|---|
| 3,738,890 | 6/1973 | Johnson et al. | 156/286 |
| 4,220,491 | 9/1980 | Metcalf et al. | 156/285 |
| 5,336,357 | 8/1994 | Layher et al. | 156/556 X |
| 5,527,421 | 6/1996 | Uehara et al. | 156/583.8 X |

*Primary Examiner*—James Engel
*Attorney, Agent, or Firm*—Harris Zimmerman

[57] ABSTRACT

An apparatus for assembly of laminated components to a card base includes a main platen secured to a pair of precision linear bearings to support the card base. Rows of vacuum holes in the platen secure the card by suction effect. A removable track location key at one edge of the main platen includes detent positions engaged by a track location lock, so that the main platen may be locked at any of those positions. A transfer platen extending parallel to the main platen is pivotally secured to the machine base. The transfer platen also includes rows of vacuum holes to hold component strips by suction effect. The transfer platen is rotatable from a loading position to the main platen to deliver a component strip to a precise position on a card secured on the main platen. The method of the invention includes placing a card substrate on the main platen and securing it thereto with vacuum suction. The main platen is positioned to receive a first component strip and secured by the track lock, and the first strip is secured by vacuum to the transfer platen in the loading position. The transfer platen is rotated to impinge the first component strip on the card substrate on the main platen. Pressure sensitive adhesive surface coatings on the components join the assembly. The transfer platen is then rotated to return to the loading position, and the main platen is indexed to a second position to receive another component. This process is reiterated to apply all of the card components on the substrate in accurate placement.

8 Claims, 4 Drawing Sheets

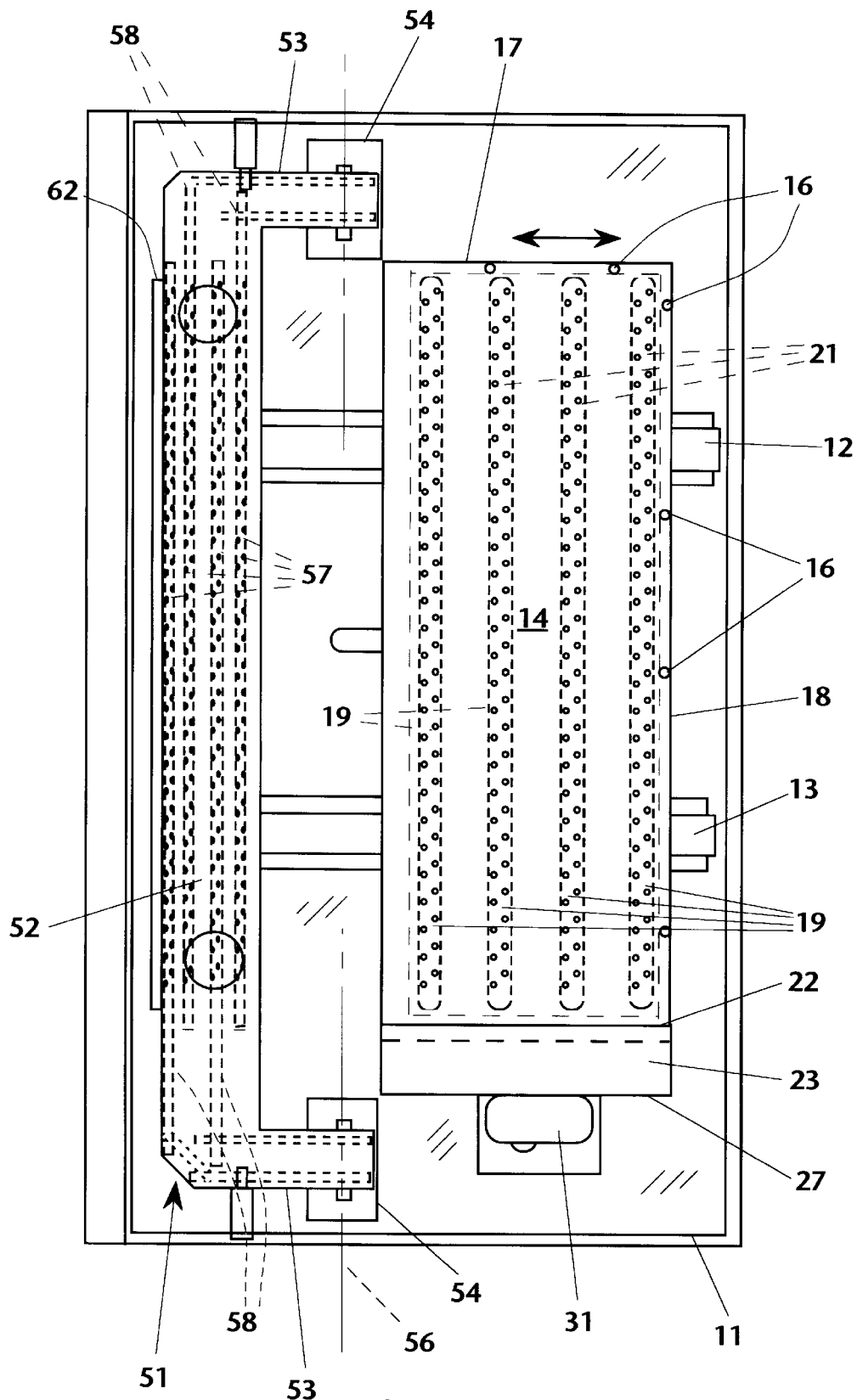
Figure_1

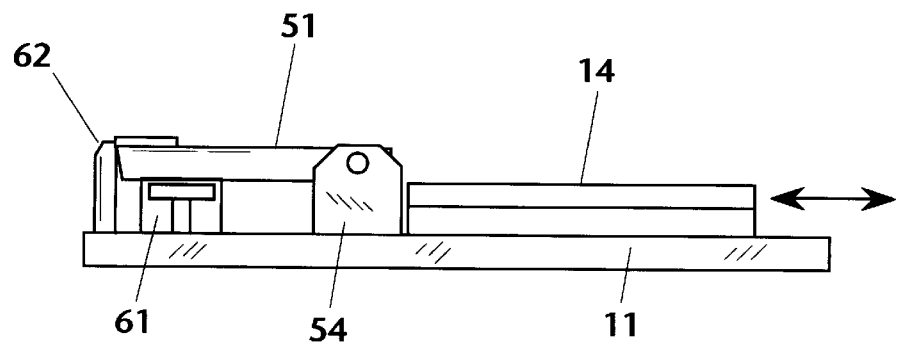
Figure_2
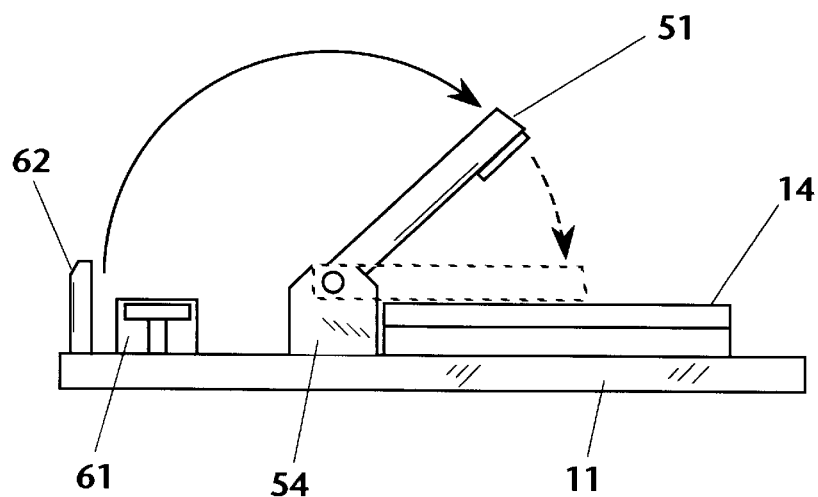
Figure_3
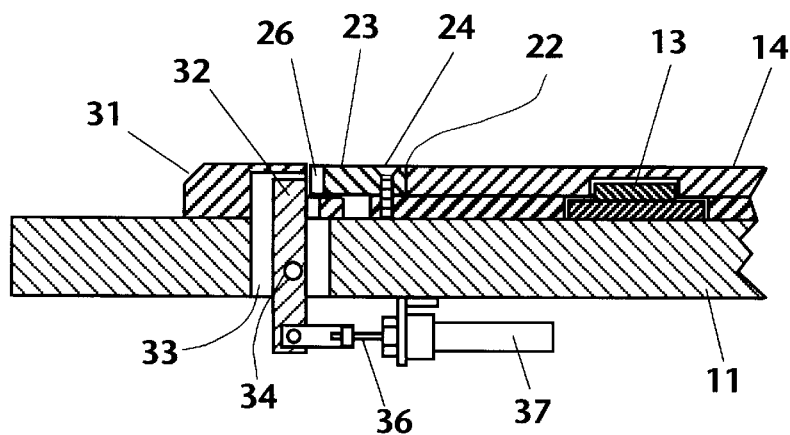
Figure_4

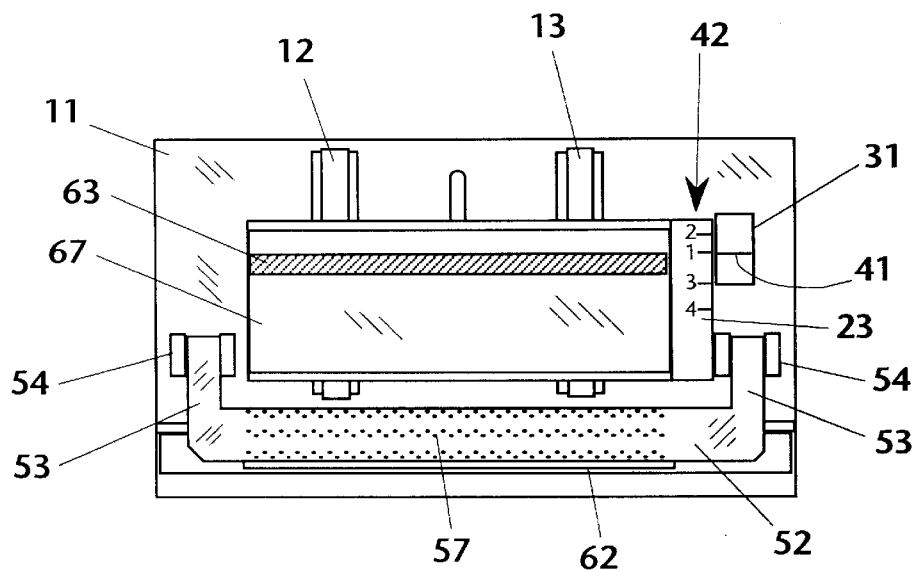
Figure_5
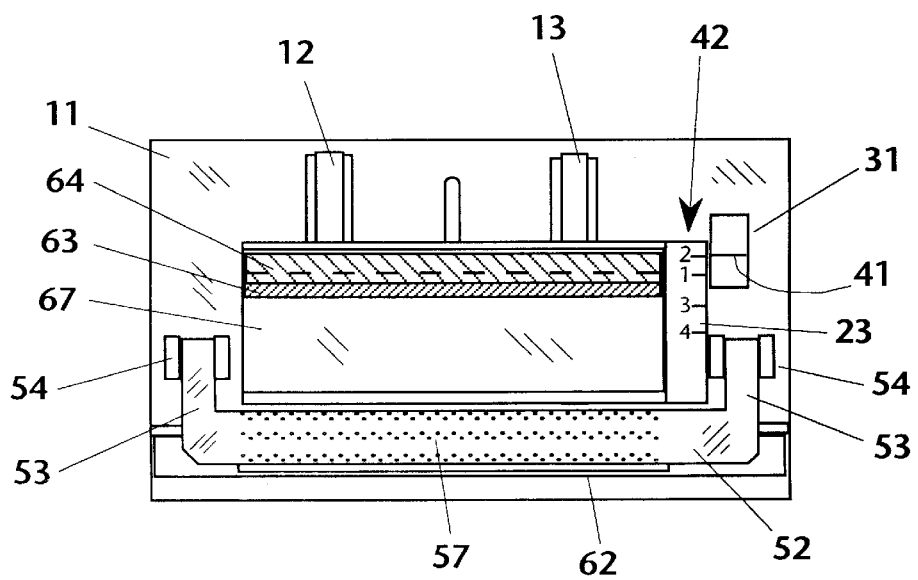
Figure_6

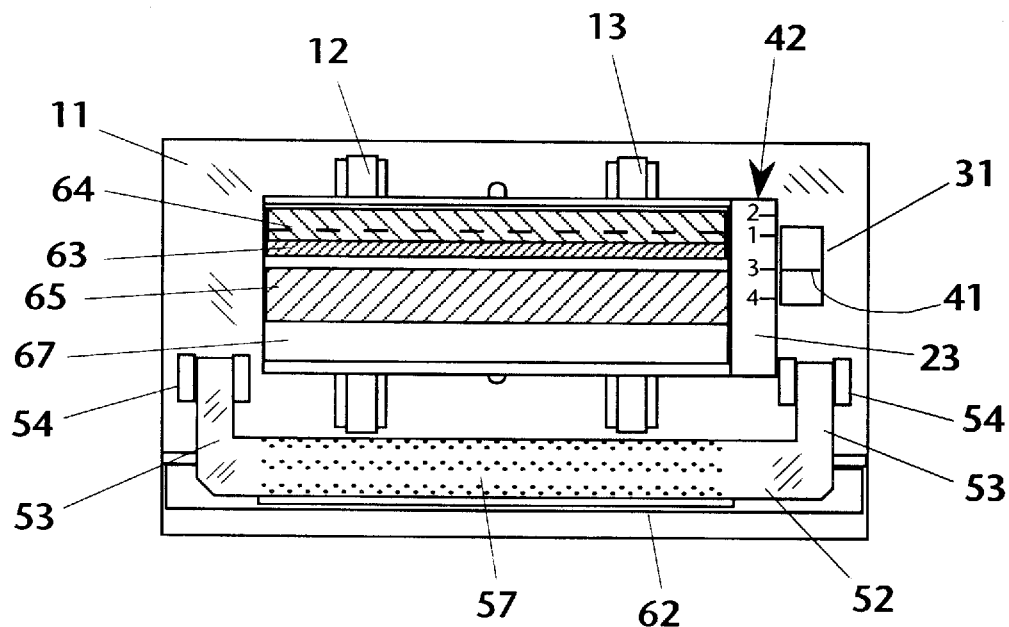
Figure_7
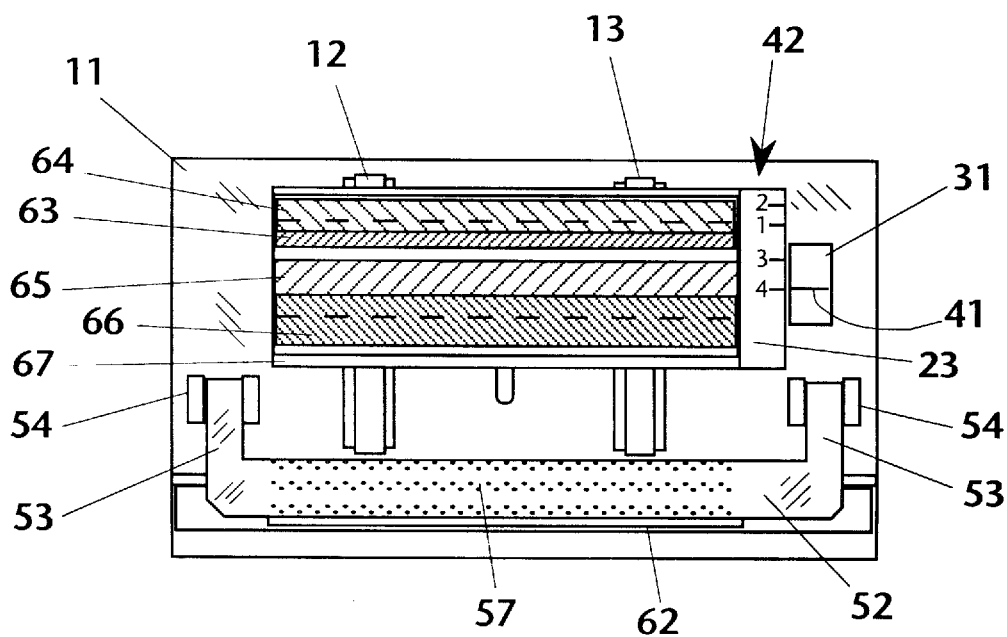
Figure_8

METHOD AND APPARATUS FOR PRECISION CARD LAMINATION

BACKGROUND OF THE INVENTION

The present invention relates to the assembly of cards having multiple components, and more particularly to apparatus for precision lamination of multiple components onto a card substrate.

It is known in the prior art to assemble multiple components or strips on a card substrate to form an apparatus that performs a predetermined and very selective function. The function generally is a synergistic result of the interaction of the components joined to the substrate. For example, many medical diagnostic tests and chemical analytical assays are now performed by test strips that are formed by assembled components on a card substrate.

Generally speaking, such a card construction includes a plurality of longitudinally extending strips secured in parallel array to a card substrate by pressure sensitive adhesive or the like. The strips may comprise diverse materials; e.g., liquid filter medium, a membrane carrier of dry reagent substances, a liquid absorbent material, one or more overlays formed of impervious plastic or the like. It is critical that these components be joined in precision spacing and alignment, either adjacent or overlapping, so that the components may interact and react to a sample liquid in a predetermined and reproducible manner. Moreover, these card assemblies are typically slit or otherwise separated into a large plurality of "sticks", the slits extending generally transversely of the component strips so that each stick includes a segment of all the assembled components. Each stick is capable of carrying out a test or assay when a sample end thereof is wetted with a liquid to be tested. The placement of the components on a card substrate must be precise and uniform, so that all sticks formed from a card assembly will provide the same analytical response.

It is known in the prior art to form such card assemblies using a platen to support the card substrate, and to use vacuum suction to removably secure the card substrate to the platen. The platen is typically fixed in position, and lamina are applied to the substrate by rotating a carrier platen to impinge on the substrate. These devices generally require a great amount of customization for each card assembly formed thereby, resulting in high labor costs and quality control problems.

SUMMARY OF THE INVENTION

The present invention generally comprises a method and apparatus for precision assembly of laminated components to a card base or substrate. Salient features of the invention are that it provides greater accuracy in the placement of the components on the substrate, and that the apparatus is more adaptable to varying card assembly configurations so that a wider variety of card assemblies may be formed by the invention.

The apparatus of the invention includes a main platen adapted to support a card base or substrate. The platen is secured to a pair of precision linear bearings that are parallel and spaced apart on a machine base. A plurality of vacuum holes are disposed in the platen in arrays of longitudinal rows, and channels within the platen provide negative gauge pressure to the holes. The vacuum channels are connected to a vacuum source through a switchable connection, so that individual rows of vacuum holes may be selected in accordance with the dimensions of the card substrate placed on the main platen. A plurality of alignment pins extend from the platen surface at two contiguous edges thereof to facilitate alignment of the card substrate on the main platen.

Joined to one edge of the main platen is a removable track location key. The track location key includes a plurality of detent positions formed therein. A track location lock is secured to the machine base adjacent to the track location key. The lock includes a pin driven by a pneumatic actuator to engage any one of the detents of the track location key, so that the main platen may be translated along the linear bearings to a plurality of predetermined positions and locked at any of those positions. The track location key includes indicia and visual markers to permit any of the track locations to be accessed by the main platen.

A transfer platen assembly includes a transfer platen extending parallel to the main platen, and a pair of arms extending from the ends of the transfer platen and pivotally secured to the machine base at opposed ends of the main platen. The transfer platen includes a plurality of vacuum holes formed in the surface thereof and arrayed in longitudinal rows. Each row is fed by an internal vacuum channel that is selectively switched to a vacuum source, whereby the vacuum suction effect may be tailored to the size of a laminated component strip secured to the transfer platen. A guide bar is secured to the machine base adjacent to the transfer platen in the loading position to facilitate precise and reproducible placement of component strips on the transfer platen. The transfer platen is adapted to be rotated from the loading position through an arc of approximately 180° to the main platen, so that a component strip may be applied to a precise position on a card secured on the main platen.

The method of the invention includes the steps of placing a card substrate on the main platen and securing the substrate thereto with vacuum suction. A track location key secured to the main platen operates in conjunction with the track location lock to permit precise placement of the main platen with respect to the machine base and the transfer platen. The main platen is positioned to receive a first component strip, and the first strip is secured by vacuum to the transfer platen in the loading position. The transfer platen is then rotated to impinge the first component strip on the card substrate on the main platen. Pressure sensitive adhesive surface coatings on the components or the substrate (or both) join the assembly. The transfer platen is then rotated to return to the loading position.

The main platen is indexed to a second position determined by the track key and secured threat by the track lock. A second component is placed on the transfer platen and held in place by vacuum, and the transfer platen is rotated to the main platen to place the second component on the card substrate in the proper position with respect to the first component. This process is reiterated to apply all of the card components on the substrate in accurate placement and alignment. Thereafter the main platen vacuum is released, and the completed card assembly is removed from the main platen. The entire process may be repeated to produce a large plurality of finished card assemblies. The finished card assemblies may be transferred to a slitter or similar device to cut the card transversely to the component strips and form a large plurality of "sticks" for diagnostic, testing and assay purposes.

Although card assemblies for forming test sticks for medical and chemical assays are described herein, it may be appreciated that card assemblies for a wide variety of purposes may be formed by the method and apparatus of the invention.

BRIEF DESCRIPTION OF THE DRAWING

FIG. 1 is a plan view of the precision card lamination apparatus of the invention.

FIG. 2 is a side elevation of the apparatus showing the transfer platen in the loading position.

FIG. 3 is a side elevation of the apparatus as in FIG. 2, showing the transfer platen rotated toward the main platen.

FIG. 4 is an enlarged fragmentary cross-sectional elevation showing the relationship of the track lock mechanism and the track key assembled to the main platen.

FIGS. 5–8 are sequential plan views of the apparatus showing the use of the track key and track index in precision placement of component strips on a card substrate.

DESCRIPTION OF THE PREFERRED EMBODIMENT

The present invention generally comprises a method and apparatus for precision assembly of laminated components to a card base or substrate. With regard to FIG. 1, the apparatus generally includes a pair of precision linear bearings 12 and 13 secured to machine base 11 in parallel, spaced apart relationship. A main platen 14 is supported on the linear bearings 12 and 13 and disposed for reciprocal translation therealong. The main platen includes machined flat upper surface having a generally rectangular configuration and adapted to support a card substrate for assembly purposes. A plurality of alignment pins extend upwardly from the upper surface of the platen and are disposed adjacent to one end 17 and one side edge 18 of the platen 14.

The main platen 14 further includes a plurality of vacuum holes formed in the upper surface of the platen 14 and arrayed in a plurality of rows 19. The rows of vacuum holes are provided to secure a card substrate in a predetermined position on the platen 14 by suction effect. The holes are connected to internal passages 21 within the platen 14 which supply negative gauge pressure. The passages 21 are connected to a vacuum source by a vacuum hose having a slack service loop (not shown) extending between the base 11 and the bottom surface of the platen 14, so that the suction effect is not affected as the platen is translated. The connections are arranged so that one or more adjacent rows 19 may be supplied with negative gauge pressure by selector switches, in accordance with the dimensions of the card substrate to be secured to the platen 14.

Joined to one end 22 of the main platen is a removable track location key 23, as shown in FIGS. 1 and 4. The key 23 is secured to the platen by a plurality of machine screws 24 and precisely positioned by a dowel pin (not shown) extending between platen 14 and key 23. The key 23 includes a plurality of detent slots 26 formed in an edge 27 extending parallel to end 22. The detent slots 26 are placed precisely in accordance with preselected positions of platen 14 that correspond with placement of component strips to be laminated to a card substrate supported on platen 14, as will be explained below.

A track index housing 31 is secured to the machine base 11 directly adjacent to edge 27 of the track key 23. Within the housing 31 a detent latch lever 32 is disposed in an opening 33 which extends through the machine base 11. The lever is pivotally secured by pin 34, and the lower end of the lever 32 is connected to the piston rod 36 of a pneumatic actuator 37. The upper end of lever 32 is disposed to engage any of the track detent slots 26 that are moved into registration therewith. The actuator 37 is spring operated to extend in its quiescent position, so that the upper end of lever 32 will normally remain engaged in a detent slot 26, and may be disengaged only by application of pneumatic pressure to the actuator 37.

With regard to FIGS. 5–8, the upper surface of the track index housing is provided with a track index line 41, and the track key 23 is provided with track number indicia and associated positioning lines 42, whereby the main platen 14 may be positioned precisely with respect to the track index 41. It may be appreciated that each track number is associated with a detent slot 26, so that the platen 14 may be locked in each numbered location to enable placement of a component strip on a card substrate on platen 14. Furthermore, a plurality of track location keys 23 may be provided, each configured to guide the construction of a particular card substrate assembly, the keys 23 being removable and replaceable on platen 14.

Another important component of the apparatus is a transfer platen assembly 51, as shown in FIGS. 1–3. The assembly 51 includes a transfer platen 52 extending parallel to main platen 14, and a pair of arms 53 extend from opposed ends of the platen 52 in spaced apart opposition. The arms are joined to pivot pins supported in bearing blocks 54, the pivot pins defining a pivot axis 56 for the transfer platen assembly. The platen 52 includes a plurality of vacuum holes formed in the upper surface of the platen 52 and arrayed in a plurality of rows 57. The rows of vacuum holes are provided to secure a component strip in a predetermined position on the platen 52 by suction effect. The holes are connected to internal passages 58 within the platen 14 which supply negative gauge pressure. The passages 58 are connected to a vacuum source through vacuum ports embodied in the bearing pins and blocks, the ports being individually switchable to apply vacuum suction selectively to each row 57, whereby the vacuum suction effect may be tailored to the dimensions of a laminated component strip secured to the transfer platen With regard to FIGS. 2 and 3, the transfer platen assembly 51 is pivotable from a loading position (FIG. 2) through an arc of approximately 180° to a delivery position (FIG. 3) in which it impinges on a longitudinal portion of the main platen 14. A guide bar 62 extends upwardly from the base 11 directly adjacent to the distal edge of the transfer platen in the loading position to facilitate precise and reproducible placement of component strips on the transfer platen. A pillow block 61 supports the transfer platen assembly in the loading position.

It may be noted that the apparatus of the invention is free of any electrical controls, and that all functions may be carried out using pneumatic actuators. The vacuum suction may be supplied from a vacuum source, or from an air pressure-vacuum generator module.

The method of the invention will be described with reference to the apparatus described herein and shown in the sequential FIGS. 5–8. Initially, a track location key 23 is selected which embodies the detent slots 26 and associated indicia and markings 42 which correspond to the desired placement of component strips on a card substrate. The selected key 23 is secured to the main platen 14, and the platen is moved to track location 1 and latched in place using the track lock 32 and associated mechanism. A card substrate 67 is then placed on platen 14 with two contiguous edges abutting alignment pins 16, and vacuum suction is applied to the platen 14 to secure the card 67 in place. The upper surface may be provided with pressure sensitive adhesive, typically covered by a release liner, and the release liner is removed.

The transfer platen assembly 51 is placed in the loading position, and the component strip to be placed on the card substrate is disposed on the transfer platen 52 and abutted against the guide bar 62. Vacuum suction is switched on to the appropriate rows 57 to secure the component to the transfer platen 52. If the component strip is provided with pressure sensitive adhesive, the release liner is removed therefrom. The transfer platen assembly is then rotated to the delivery position, the edge of the component strip 63 that was abutting the guide bar 62 is placed in precise alignment with the track location 1 indicator mark (FIG. 5). Thereafter, the vacuum suction of the transfer platen is turned off, and the transfer platen assembly is rotated to return to the loading position.

The track lock mechanism is released, and the main platen 14 is translated manually to track location 2 (FIG. 6). The track lock mechanism is engaged once more, and the next component strip 64 is placed on the transfer platen 52 abutting the guide bar 62. Vacuum suction is switched on the transfer platen, and the transfer platen assembly is rotated to the delivery position. After the strip 64 is placed on the card substrate, the transfer platen vacuum is switched off, and the transfer platen assembly is returned to the loading position.

The process described above is reiterated to secure component strips 65 and 66 to the substrate 67, as shown in FIGS. 7 and 8. The number of component strips applied to the substrate is not limited by the apparatus. It is noted that the placement of the strips is entirely dependent on the track location embodied in the key 23, and that proper design of the key 23 results in precise placement of the strips. The strips may overlap or be spaced in separation, as required for the functioning of the final assembly. When all component strips have been assembled, the main platen vacuum may be switched off, and the card assembly may be removed. The assembly may be rolled or pressed to assure sufficient adhesion of all components. A protective cover liner may be secured to protect the outer surface of the assembly.

The foregoing description of the preferred embodiment of the method and apparatus has been presented for purposes of illustration and description. It is not intended to be exhaustive or to limit the invention to the precise form disclosed, and many modifications and variations are possible in light of the above teaching without deviating from the spirit and the scope of the invention. The embodiment described is selected to best explain the principles of the invention and its practical application to thereby enable others skilled in the art to best utilize the invention in various embodiments and with various modifications as suited to the particular purpose contemplated. It is intended that the scope of the invention be defined by the claims appended hereto.

We claim:

1. An apparatus for precision lamination of components to a card assembly, including;

a main platen for supporting a card substrate;

means for translating said main platen along a first axis;

track location key means for demarcating preselected positions of said main platen along said first axis;

track lock means for releasably retaining said main platen at any of said preselected positions along said first axis;

transfer platen means for supporting a component to be laminated to the card substrate;

means for rotating said transfer platen means about a second axis to place a component supported thereon onto a card substrate supported on said main platen;

first vacuum suction means for removably securing a card substrate to said main platen, said first vacuum suction means includes a plurality of vacuum holes formed in an upper surface of said main platen and connected to at least one vacuum channel disposed within said main platen;

said vacuum holes arrayed in a plurality of rows, said rows extending generally transversely to said first axis;

a plurality of said vacuum channels connected to said rows of vacuum holes to apply negative gauge pressure selectively to said plurality of rows and apply vacuum suction in selected areas of said upper surface of said main platen;

said means for translating said main platen along a first axis including a pair of linear bearings disposed in parallel, spaced apart arrangement to engage said main platen;

said track location key means including a track location key secured to said main platen and extending generally parallel to said first axis;

said track location key including demarcating indicia to identify a plurality of preselected tracks, each track comprising a narrow band extending across said main platen and the card substrate thereon, said narrow bands extending generally transversely to said first axis; and, said track location key including a plurality of detent stops formed in one edge portion thereof, each of said detent stops corresponding to a respective one of said plurality of tracks.

2. The apparatus of claim 1, wherein said track lock means includes detent latch means for selectively engaging any one of said plurality of detent stops of said track location key and place any one of said plurality of tracks in a predetermined location with respect to said transfer platen means.

3. The apparatus of claim 2, wherein said transfer platen means includes a transfer platen rotatable about said second axis between a loading position in which the transfer platen is disposed to receive a card component, and a delivery position is which the transfer platen is disposed to impinge the card component on a card substrate supported on said main platen.

4. The apparatus of claim 3, wherein said first and second axes are disposed in generally perpendicular relationship.

5. An apparatus for precision lamination of components to a card assembly, including;

a main platen for supporting a card substrate;

means for translating said main platen along a first axis;

track location key means for demarcating preselected positions of said main platen along said first axis;

track lock means for releasably retaining said main platen at any of said preselected positions along said first axis;

transfer platen means for supporting a component to be laminated to the card substrate;

means for rotating said transfer platen means about a second axis to place a component supported thereon onto a card substrate supported on said main platen;

said track location key means including a track location key secured to said main platen and extending generally parallel to said first axis;

said track location key including demarcating indicia to identify a plurality of preselected tracks, each track comprising a narrow band extending across said main platen and the card substrate thereon, said narrow bands extending generally transversely to said first axis; and, said track location key including a plurality of detent stops formed in one edge portion thereof, each of said detent stops corresponding to a respective one of said plurality of tracks.

6. The apparatus of claim 5, wherein said track lock means includes detent latch means for selectively engaging any one of said plurality of detent stops of said track location key and place any one of said plurality of tracks in a predetermined location with respect to said transfer platen means.

7. The apparatus of claim 6, wherein said detent latch means includes a detent latch, and pneumatic actuator means for pivotally moving said detent latch into engagement with any one of said plurality of detent stops.

8. The apparatus of claim 6, further including a plurality of said track location keys removably securable to said main platen, each of said track location keys including a unique combination of said track demarcating indicia and detent stops corresponding to the demarcated tracks, said keys being substitutable on said main platen for distinct card assemblies.

* * * * *